(12) United States Patent
Park et al.

(10) Patent No.: US 12,203,650 B2
(45) Date of Patent: Jan. 21, 2025

(54) WASTE HEAT RECOVERY SYSTEM AND METHOD

(71) Applicant: Samsung E&A Co., Ltd., Seoul (KR)

(72) Inventors: Chae Gwan Park, Seoul (KR); Joeng Min Oh, Seoul (KR); Tae Jin Park, Seoul (KR); Jun Ho Seo, Seoul (KR); Yong Jung Kim, Seoul (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/723,519

(22) PCT Filed: Nov. 9, 2022

(86) PCT No.: PCT/KR2022/017557
§ 371 (c)(1),
(2) Date: Jun. 24, 2024

(87) PCT Pub. No.: WO2023/163320
PCT Pub. Date: Aug. 31, 2023

(65) Prior Publication Data
US 2024/0418360 A1 Dec. 19, 2024

(30) Foreign Application Priority Data
Feb. 22, 2022 (KR) .......... 10-2022-0023134

(51) Int. Cl.
| | |
|---|---|
| F22B 1/18 | (2006.01) |
| F23J 3/02 | (2006.01) |
| F23J 3/04 | (2006.01) |
| F23J 3/06 | (2006.01) |
| F23J 15/02 | (2006.01) |
| F23J 15/04 | (2006.01) |

(52) U.S. Cl.
CPC ............. *F22B 1/18* (2013.01); *F23J 3/023* (2013.01); *F23J 3/04* (2013.01); *F23J 3/06* (2013.01); *F23J 15/02* (2013.01); *F23J 15/04* (2013.01)

(58) Field of Classification Search
CPC ....... F22B 1/18; F23J 3/023; F23J 3/04; F23J 3/06; F23J 15/02; F23J 15/04
USPC .................................................. 122/235.26
See application file for complete search history.

(56) References Cited

U.S. PATENT DOCUMENTS

| | | | | |
|---|---|---|---|---|
| 1,957,583 | A | * 5/1934 | Foresman | .......... F23J 1/02 |
| | | | | 110/165 R |
| 5,517,950 | A | 5/1996 | Kendrick | |

FOREIGN PATENT DOCUMENTS

| | | | |
|---|---|---|---|
| CN | 204799035 U | * | 11/2015 |
| CN | 104258683 B | * | 11/2016 |

(Continued)

OTHER PUBLICATIONS

JP 2531343 Y2—Translation (Year: 1997).*
(Continued)

*Primary Examiner* — Steven B McAllister
*Assistant Examiner* — Benjamin W Johnson
(74) *Attorney, Agent, or Firm* — Panitch Schwarze Belisario & Nadel LLP (57) ABSTRACT

A waste heat recovery system and method are disclosed. The waste heat recovery system disclosed herein comprises: a waste heat recovery boiler; a waste heat supply member configured to supply waste heat to the waste heat recovery boiler; and a water tank configured to fluidly communicate with the waste heat supply member.

8 Claims, 9 Drawing Sheets

(56) References Cited

FOREIGN PATENT DOCUMENTS

| | | | |
|---|---|---|---|
| CN | 215049976 U | * | 12/2021 |
| JP | 7044449 U | | 11/1995 |
| JP | 2531343 Y2 | * | 4/1997 |
| JP | 9299726 | | 11/1997 |
| JP | 2017101910 A | | 6/2017 |
| KR | 20030034765 A | | 5/2003 |
| KR | 100436940 B1 | | 6/2004 |
| KR | 100751036 B1 | | 8/2007 |
| KR | 20190071087 A | | 6/2019 |

OTHER PUBLICATIONS

CN 215049976 U—Translation (Year: 2021).*
CN 104258683 B—Translation (Year: 2016).*
CN 204799035 U—Translation (Year: 2015).*
Notice of Non-Final Rejection, issued on Jul. 18, 2022, in corresponding Korean Application No. 10-2022-0023134, 13 pages (with English language translation).
Notice of Allowance, issued on Oct. 28, 2022, in corresponding Korean Application No. 10-2022-0023134, 6 pages (with English language translation).
International Search Report, issued Feb. 16, 2023, in corresponding International Application No. PCT/KR2022/017557, 11 pages (including English language translation).

* cited by examiner

WASTE HEAT RECOVERY SYSTEM AND METHOD

TECHNICAL FIELD

Disclosed are a waste heat recovery system and method. More specifically, disclosed are a waste heat recovery system and method that enable continuous operation without operation shut-down.

BACKGROUND ART

A waste heat recovery boiler is a device that produces steam and hot water by recovering thermal energy from exhaust gases discharged from incinerators, furnaces, melting furnaces, chemical processes, and the like. Therefore, a waste heat recovery boiler may save energy and protect the environment by recycling discarded waste heat, and the steam or hot water thus produced may be used in industrial processes, to generate electricity using steam turbines, or to heat nearby facilities by using hot water.

The waste heat recovery boiler allows boiler water to flow inside a tube located in a path through which exhaust gas flows, and evaporates the boiler water by using the heat of the exhaust gas to generate steam, and then discharges the steam through a pipe to recover waste heat.

An ejected cooling water (i.e., the boiler water) is then evaporated due to the high temperature of the exhaust gas, thus generating steam, and the steam is circulated through a pipe to recover waste heat.

The waste heat thus recovered from the waste heat recovery boiler is then utilized to pre-heat air, generate steam, heat oil, or the like.

Prior art regarding waste heat recovery boilers includes Korean Application Publication No. 10-2019-0071087 "APPARATUS FOR RECOVERING WASTE HEAT OF EXHAUST GAS", Korean Application Publication No. 10-0751036 "NOZZLE FOR HEAT RECOVERY STEAM GENERATOR", and Korean Application Publication No. 10-0436940 "NOZZLE STRUCTURE FOR COOLER HEADER OF BOILER", etc.

In addition, because in cases in which high-temperature (500° C. or higher) exhaust gas contains a large amount of highly viscous dusts, handling and discharging of such dusts is impossible, an excessive differential pressure occurs in the inflow duct of the waste heat recovery boiler due to inevitable accumulated mass of highly viscous dusts, which subsequently necessitates a series of measures such as shut-down of facilities and internal maintenance/cleaning/dust removal, which renders normal operation impossible, and becomes a major factor in reducing productivity.

DISCLOSURE

Technical Problem

One aspect of the present disclosure provides a waste heat recovery system capable of continuous operation without operation shut-down.

Another aspect of the present disclosure provides a waste heat recovery method which enables continuous operation without operation shut-down.

Technical Solution

According to one aspect of the present disclosure, provided is a waste heat recovery system including:

a waste heat recovery boiler;
a waste heat supply member configured to supply waste heat to the waste heat recovery boiler; and
a water tank configured to be in fluid communication with the waste heat supply member.

The waste heat recovery boiler may include an exhaust gas flow path, and a plurality of cooling tubes disposed to be spaced apart from each other within the exhaust gas flow path.

The waste heat supply member comprises a main duct, an inflow duct, and an outflow duct, wherein the inflow duct is configured to be in fluid communication with a side portion of the main duct, the outflow duct is configured to be in fluid communication with an upper portion of the main duct, and the water tank is configured to be in fluid communication with a lower portion of the main duct.

The waste heat recovery system may further include, in a case in which dusts originating from exhaust gas are accumulated in the waste heat supply member, an air blaster configured to forcibly transfer the accumulated dusts to the water tank.

The waste heat recovery system may further include a flexible joint disposed between the main duct and the water tank and configured to connect the main duct and the water tank to each other.

The waste heat recovery system may not include a dust falling hindering member between the main duct and the water tank.

The waste heat recovery system may further include a water supply pipe and a water drain pipe, each configured to be in fluid communication with the water tank, and a circulation pipe branched from the water drain pipe.

The waste heat recovery system may further include a water level meter configured to measure a level of liquid filled in the water tank, a pump configured to discharge liquid from the water tank, and a third flow control valve configured to be installed at a back-end of the circulation pipe as a back-end of the pump and control a discharge amount of liquid in accordance with a signal of the water level meter.

The waste heat recovery system may further include an equalization water tank configured to be in fluid communication with the water tank, and may be configured to supply water to the water tank from the equalization water tank in accordance with a pressure difference between a water pressure of the equalization water tank and a liquid pressure of the water tank.

According to another aspect of the present disclosure, provided is a waste heat recovery method including:

a step (S10) of supplying exhaust gas of a high temperature of 500° C. or more to a duct-shaped waste heat supply member;
a step (S20) of recovering waste heat by supplying, to a waste heat recovery boiler, a portion of the exhaust gas having passed through the waste heat supply member; and
a step (S30) of supplying, to a water tank, a remaining portion of the exhaust gas having passed through the waste heat supply member.

The step (S30) may be configured to allow a portion of dusts included in the exhaust gas to fall to the water tank due to gravity without being hindered by a dust falling hindering member.

The waste heat recovery method may further include a step (S40) of maintaining a concentration of sodium carbonate in liquid filled in the water tank at a reference value or less.

The step (S40) may include a step (S40-1) of supplying water to the water tank at a first flowrate, a step (S40-2) of discharging liquid filled in the water tank at a second flowrate, a step (S40-3) of recirculating a portion of the liquid discharged in the step (S40-2) to the water tank at a third flowrate, and a step (S40-4) of discharging a remaining portion of the liquid discharged in the step (S40-2) at a fourth flowrate out of the water tank.

The waste heat recovery method may further include a step (S50) of measuring a level of the liquid filled in the water tank, and the fourth flowrate in the step (S40-4) may be determined according to the level of liquid in the water tank measured in the step (S50).

Advantageous Effects

A waste heat recovery system and method according to an embodiment of the present disclosure have the following advantageous effects:

(1) Continuous operation without operation shut-down may become possible by continuously removing dusts introduced into a dead zone while operating.

(2) Clogging of spaces between cooling tubes installed within a waste heat recovery boiler by dusts may be ameliorated.

(3) By alleviating the issue of decreasing heat transfer efficiency due to dusts covering the surface of cooling tubes installed in the waste heat recovery boiler, improvement in waste heat recovery performance of the waste heat recovery boiler, as well as increases in steam production amount and waste heat recovery capacity, may be expected.

MODE FOR INVENTION

Hereinbelow, a waste heat recovery system according to an embodiment of the present disclosure is described in greater detail with reference to the drawings.

In the present specification, "fluid communication" means that two or more members are connected such that fluid is able to flow within these members.

Figure 1:
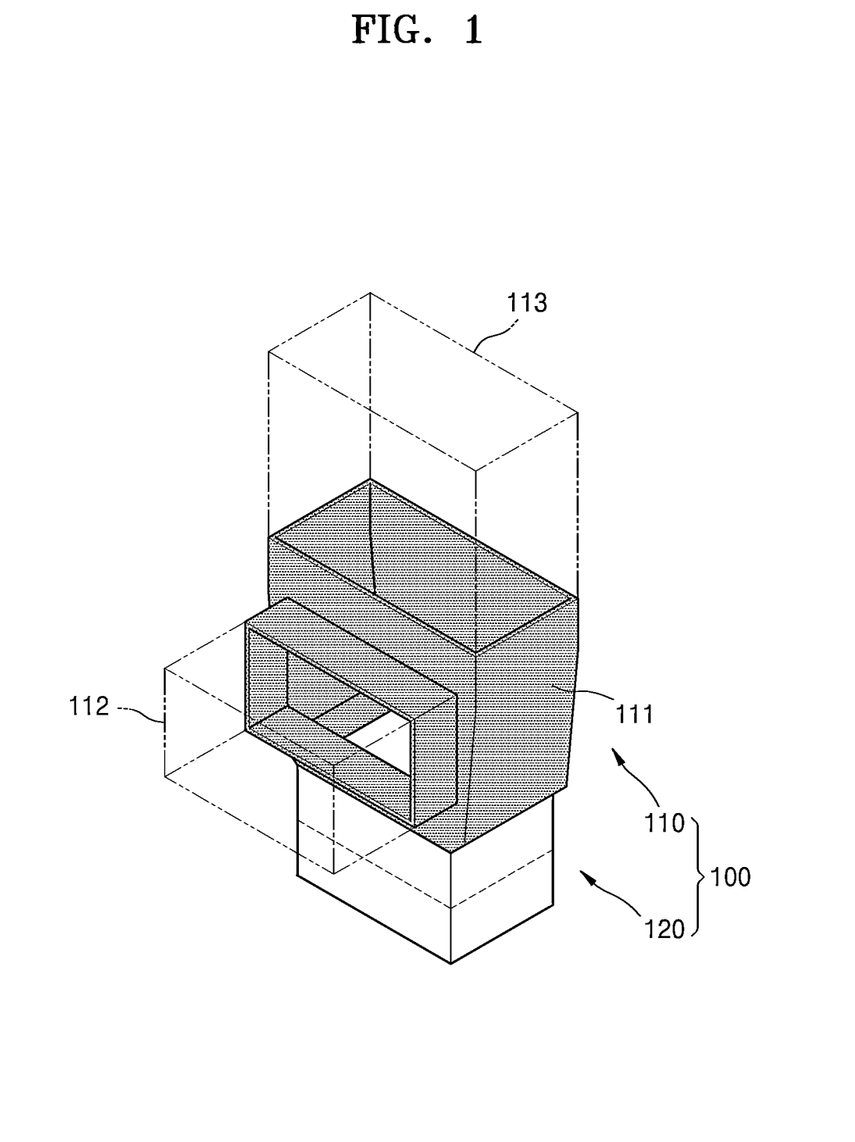
FIG. 1 is a partial perspective view of a waste heat recovery system according to an embodiment of the present disclosure.
Figure 2:
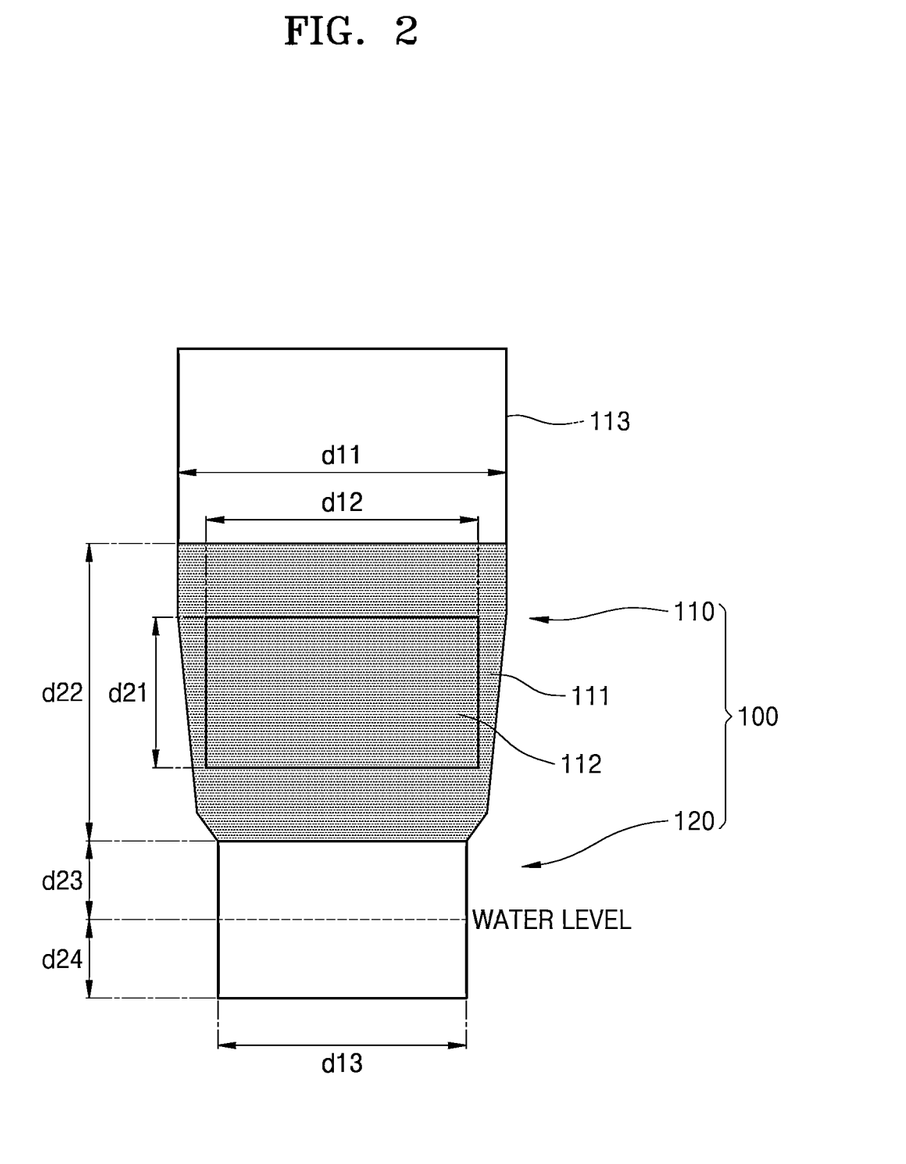
FIG. 2 is a front view of the waste heat recovery system of FIG. 1.
Figure 3:
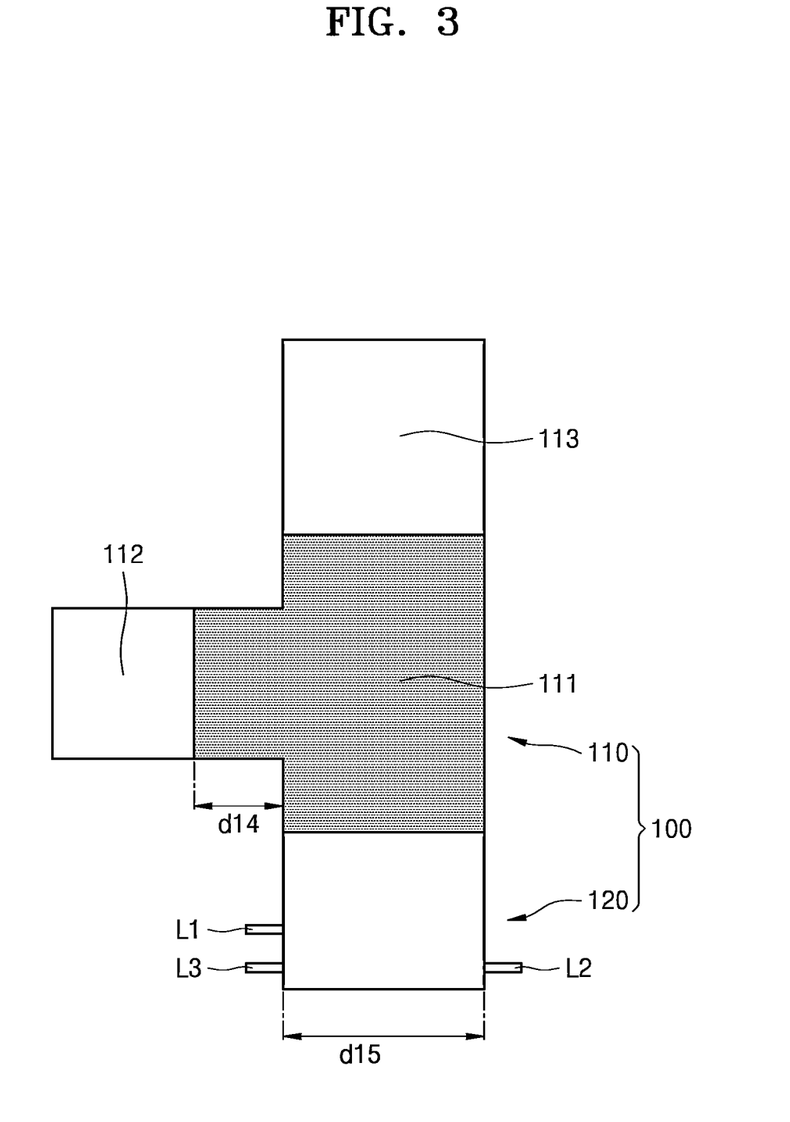
FIG. 3 is a side view of the waste heat recovery system of FIG. 1.
Figure 4:
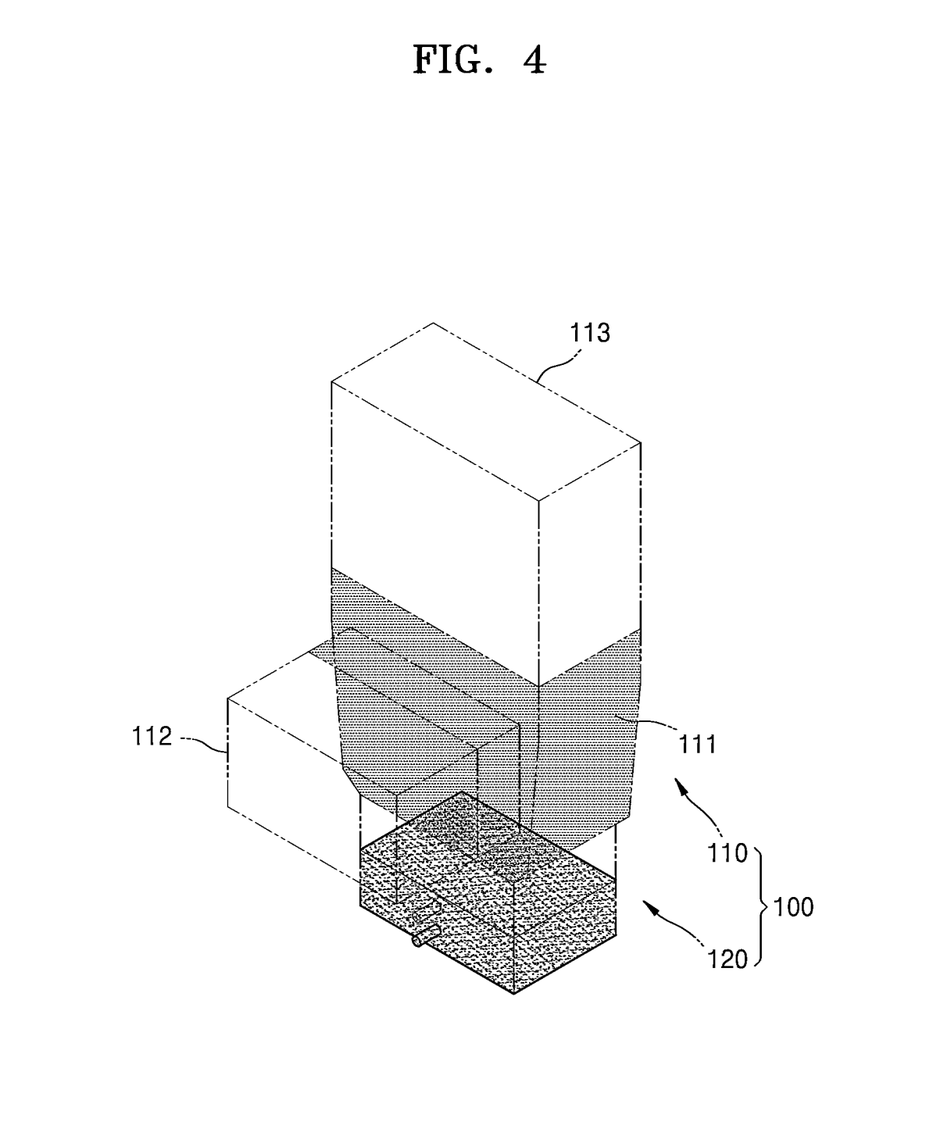
FIG. 4 is a perspective view of the waste heat recovery system of FIG. 1.

FIG. 1 is a partial perspective view of a waste heat recovery system 100 according to an embodiment, FIG. 2 is a front view of the waste heat recovery system 100 of FIG. 1, FIG. 3 is a side view of the waste heat recovery system 100 of FIG. 1, and FIG. 4 is a perspective view of the waste heat recovery system 100 of FIG. 1.

Referring to FIGS. 1 to 4, the waste heat recovery system 100 according to an embodiment of the present disclosure includes a waste heat recovery boiler (not shown), a waste heat supply member 110, and a water tank 120.

The waste heat recovery boiler may include an exhaust gas flow path (not shown) therein and a plurality of cooling tubes (not shown) positioned to be spaced apart from each other within the exhaust gas flow path.

Cooling water may flow through each of the cooling tubes. Accordingly, exhaust gas having passed through the exhaust gas flow path may be cooled by contact with the respective cooling tubes and at the same time, the cooling water flowing inside the respective cooling tubes may be heated. The heated cooling water may be recovered in the form of hot water or steam, and utilized for heating of nearby facilities, and the like.

The waste heat recovery boiler may be installed in an upper portion of an outflow duct 113 of a waste heat recovery member 110 described below, and may be configured to be in fluid communication with the upper part of the outflow duct 113. The waste heat supply member 110 may include a main duct 111, an inflow duct 112, and the outflow duct 113, which are connected in fluid communication with each other.

The inflow duct 112 may be configured to be in fluid communication with a side portion of the main duct 111.

The outflow duct 113 may be configured to be in fluid communication with an upper portion of the main duct 111.

For example, the main duct 111, the inflow duct 112, and the outflow duct 113 may be formed as a single body.

Once exhaust gas discharged from incinerators, blast furnaces, melting furnaces, chemical processes, etc., is supplied to the waste heat supply member 110, most of the exhaust gas may flow into the waste heat recovery boiler and be cooled by losing heat via heat exchange with the cooling tubes, and in this cooled state may leave the waste heat recovery boiler.

The exhaust gas contains dusts, and these dusts are characterized by low density, high viscosity, and high water solubility.

In addition, if such dusts are accumulated in a lower end of a waste heat recovery boiler facility (e.g., a lower end of the waste heat supply member 110) in a concentrated manner, these dusts may block the path for the exhaust gas to flow toward the waste heat recovery boiler and give rise to an excessive differential pressure that renders the normal operation of facilities impossible, and particularly, handling of such dusts may become extremely difficult at a high temperature of 500° C. or more.

In addition, part of the exhaust gas may enter a water tank 120, which will be described below, and in this case, dusts contained in the exhaust gas may fall to the water tank 120 due to gravity. As described, as a portion of dusts contained in the exhaust gas falls to the water tank 120 and is then removed on-line from the water tank 120 while the waste heat recovery boiler is operating, it may be possible to prevent accumulation of dusts within the waste heat supply member 110, thereby reducing a differential pressure from occurring in the waste heat supply member 110 and reducing the amount of dusts supplied to the waste heat recovery boiler. Furthermore, it may be possible to ameliorate (for example, by 5% to 10%) the issue of spaces between cooling tubes installed inside the waste heat recovery boiler being blocked by dusts and at the same time, ameliorate the issue of heat transfer efficiency decreasing due to the surface of the cooling tubes being covered by dusts. As a result, the benefits of improvement in waste heat recovery performance of the waste heat recovery boiler, increases in the generation amount of hot water or steam, and increases in waste heat recovery capacity can be expected.

The water tank 120 serves to mix the dusts introduced therein with water to thereby form aqueous solution.

In addition, the water tank 120 may be configured to be in fluid communication with the waste heat supply member 110. For example, the water tank 120 may be configured to be in fluid communication with a lower portion of the main duct 111. Accordingly, the water tank 120 may be installed in a dead zone, e.g., an area that is apart from the main stream of high-temperature exhaust gas that sequentially passes through the inflow duct 112, the main duct 111, and the outflow duct 113, and as a result may be less affected by high temperature.

For instance, if the water tank 120 is not installed in the waste heat recovery system 100, having the dusts accumulated in the waste heat supply member 110 discharged on-line becomes impossible, in which case, only after an internal blockage has occurred, the entire facilities have to be shut down and cooled, and the accumulated dusts have to be manually cleaned out from the inside, incurring the related expenses and operational downtime cost.

In addition, the waste heat recovery system 100, in a case in which dusts originating from exhaust gas are accumulated in the waste heat supply member 110, may further include an air blaster (not shown) configured to forcibly transfer the accumulated dusts to the water tank 120. Specifically, the air blaster may be configured to eject compressed air to dusts accumulated in the waste heat supply member 110 (e.g., inflow duct 112), thereby forcibly swiping the accumulated dusts into the water tank 120.

In addition, the waste heat recovery system 100 may further include a flexible joint (not shown).

The flexible joint may be disposed between the main duct 111 and the water tank 120 and configured to connect the main duct 111 and the water tank 120 to each other. When the main duct 111 and the water tank 120 undergo thermal expansion and thermal contraction, such a flexible joint may accommodate their thermal expansion and thermal contraction, thereby serving to ensure the secure connection between the main duct 111 and the water tank 120 at all times.

In addition, the waste heat recovery system 100 may not include a dust falling hindering member (not shown) between the main duct 111 and the water tank 120.

The dust falling hindering member refers to any member that hinders dusts included in the exhaust gas from falling from the main duct 111 to the water tank 120 by gravity. For example, the dust falling hindering member may include an electrostatic precipitator, a filter, or a combination thereof.

For instance, if the dust falling hindering member is installed between the main duct 111 and the water tank 120, highly viscous dusts may stick to the dust falling hindering member, giving rise to dust accumulation over time, such dust accumulation worsens such that dust accumulation may occur even inside the waste heat supply member 110, which defeats the original purpose of installing the water tank 120.

Although the waste heat supply member 110 is not limited to any particular shape or size, and likewise, the water tank 120 is not limited to any particular shape or size, examples thereof are illustrated in FIGS. 1 to 4.

Figure 5:
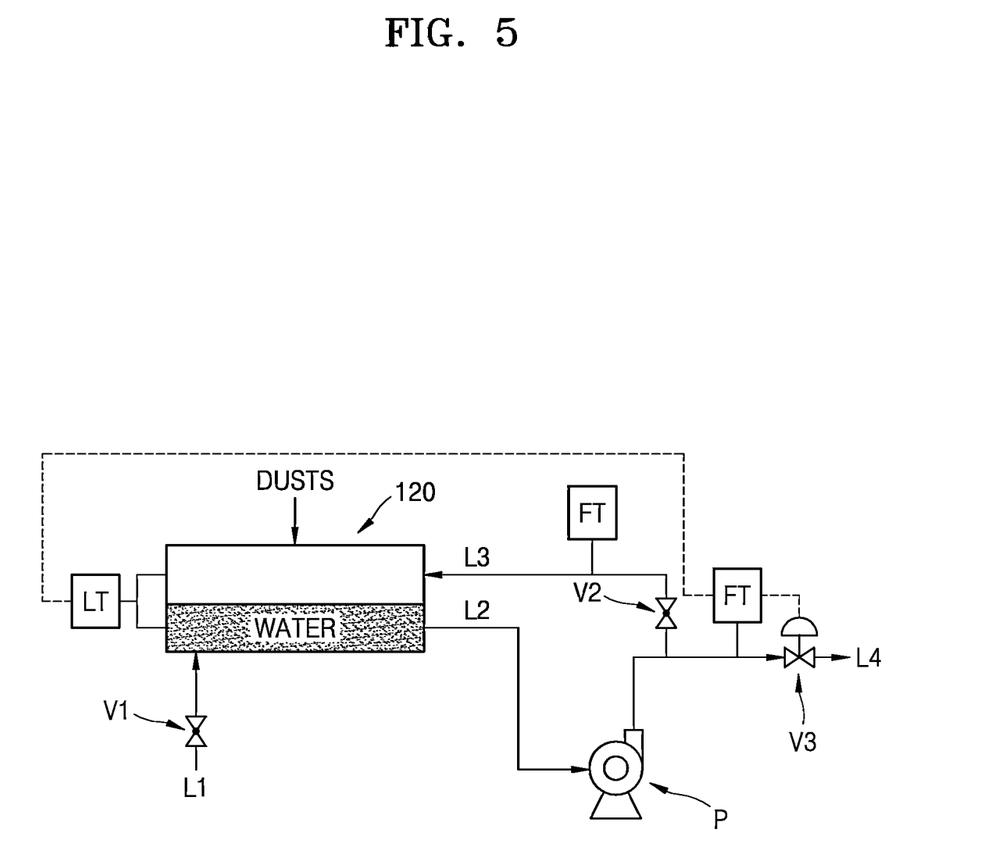
FIG. 5 is a diagram schematically showing a water tank and auxiliary facilities connected thereto of the waste heat recovery system of FIG. 1.

In addition, the waste heat recovery system 100 may further include a water supply pipe L1, water drain pipes L2, L4, and a circulation pipe L3, each configured to be in fluid communication with the water tank 120.

The water supply pipe L1 serves to supply water to the water tank 120.

The water drain pipe L2 serves to drain liquid (e.g., a mixture of water and dusts) from the water tank 120.

The circulation pipe L3, which is branched from the water drain pipe L2, serves to recirculate part of liquid flowing through the water drain pipe L2 to the water tank 120.

The water drain pipe L4 serves to discharge to the outside, thereby remove, part of liquid discharged from the water tank 120 via the water drain pipe L2.

In addition, the waste heat recovery system 100 may further include a first flow control valve V1 and a second flow control valve V2.

The first flow control valve V1 is installed in the water supply pipe L1 and serves to control the flowrate of water supplied to the water tank 120 via the water supply pipe L1.

The second flow control valve V2 is installed in the circulation pipe L3 and serves to control the flowrate of liquid being recirculated to the water tank 120 via the circulation pipe L3, among liquid discharged from the water tank 120 via the water drain pipe L2.

The first flow control valve V1 and the second flow control valve V2 may each be a globe valve, but the present disclosure is not limited thereto.

In addition, the waste heat recovery system 100 may further include a water level meter LT, a pump P, and a third flow control valve V3.

The water level meter LT may be configured to measure the level of liquid filled in the water tank 120.

The pump P may be configured to forcibly discharge liquid from the water tank 120.

The third flow control valve V3 may be installed at a back-end of the circulation pipe L3 as a back-end of the pump P and configured to control the discharge amount of liquid in accordance with a signal from the water level meter LT. The liquid having passed through the third flow control valve V3 may be discharged to the outside via the water drain pipe L4.

In addition, a flow meter FT may be installed in each of the water drain pipe L2 and the circulation pipe L3.

Another embodiment of the present disclosure provides a waste heat recovery method that can be carried out by using the aforementioned waste heat recovery system 100.

Hereinbelow, a waste heat recovery method according to an embodiment of the present disclosure is described in greater detail with reference to FIGS. 1 to 5.

The waste heat recovery method includes a step (S10) of supplying exhaust gas of a high temperature of 500° C. or more to a duct-shaped waste heat supply member 110; a step (S20) of recovering waste heat by supplying a portion of the exhaust gas having passed through the waste heat supply member 110 to a waste heat recovery boiler (not shown); and a step (S30) of supplying a remaining portion of the exhaust gas having passed through the waste heat supply member 110 to a water tank 120.

The step (S30) may be configured to allow a portion of dusts included in the exhaust gas to fall to the water tank 120 by gravity without hindrance from a dust falling hindering member (not shown).

In addition, the waste heat recovery method may further include a step (S40) of maintaining a concentration of sodium carbonate in liquid filled in the water tank 120 at a reference value (for example, 10 wt %) or less.

The step (S40) may include a step (S40-1) of supplying water to the water tank 120 at a first flowrate (for example, 10 m³/hr), a step (S40-2) of discharging liquid filled in the water tank 120 at a second flowrate (for example, 60 m³/hr), a step (S40-3) of recirculating a portion of the liquid discharged in the step (S40-2) to the water tank 120 at a third flowrate (for example, 50 m³/hr), and a step (S40-4) of discharging a remaining portion of the liquid discharged in the step (S40-2) out of the water tank 120 at a fourth flowrate (for example, 10 m³/hr).

In addition, the waste heat recovery method may further include a step (S50) of measuring the level of liquid filled in the water tank 120. In this case, the fourth flowrate in the step (S40-4) may be determined in accordance with the level of liquid in the water tank 120 measured in the step (S50). For example, as the amount or temperature of exhaust gas introduced to the water tank 120 increases, the amount of water evaporated from the water tank 120 increases, and to manage such a situation, the fourth flowrate may be decreased.

Figure 6:
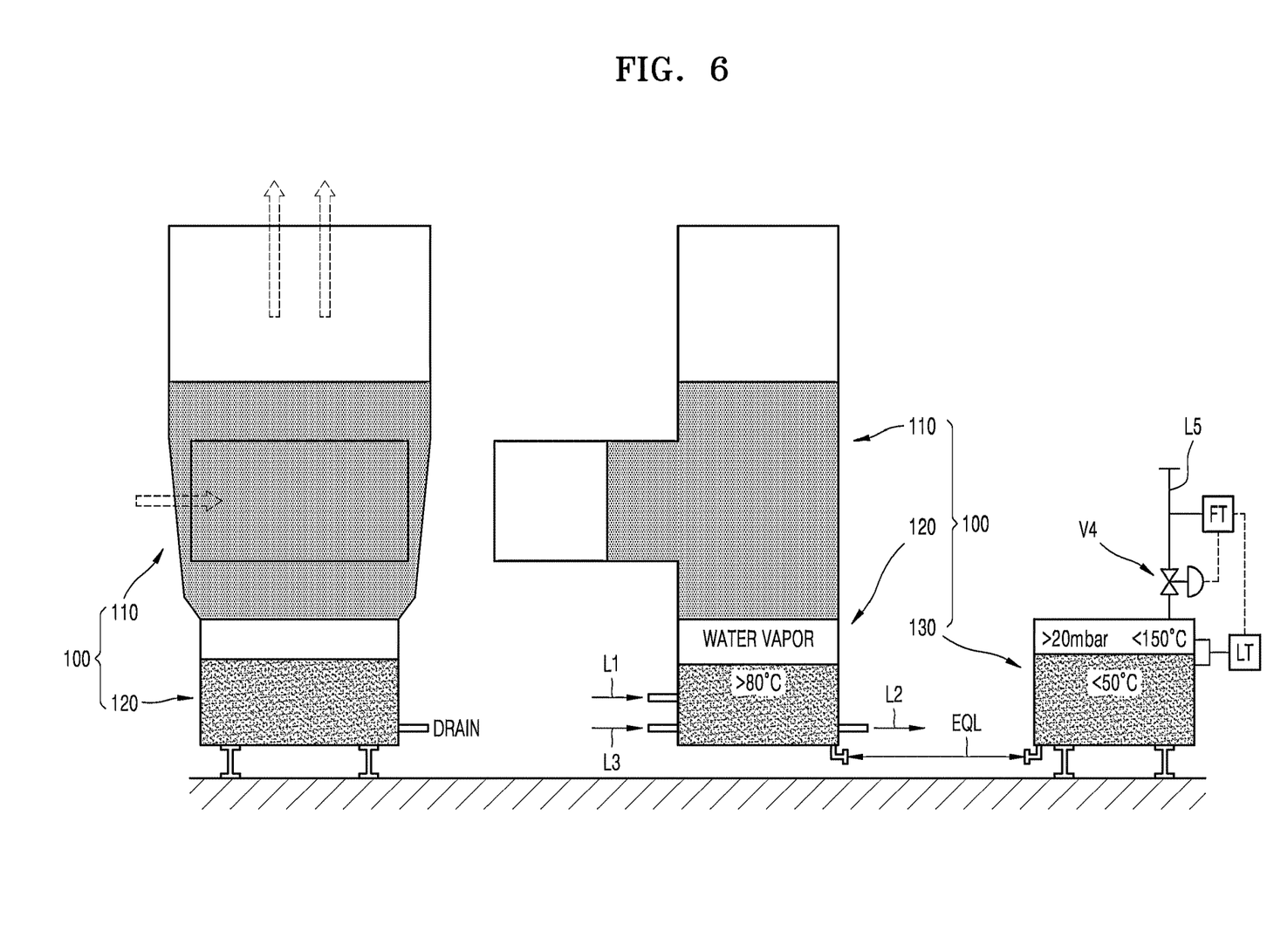
FIG. 6 is a diagram showing an equalization water tank added to the waste heat recovery system of FIG. 1.

In addition, in an emergency situation where a large amount of water is instantaneously evaporated, or a large amount of water is drained due to leakage from the water tank 120, the waste heat recovery method may further include a step (S60) of supplying water to the water tank 120 from an equalization water tank 130 in fluid communication with the water tank 120, in accordance with a pressure difference between a water pressure of the equalization water tank 130 and a liquid pressure of the water tank 120.

FIG. 6 is a diagram showing the equalization water tank 130 added to the waste heat recovery system 100 of FIG. 1.

Referring to FIG. 6, the waste heat recovery system 100 may further include the equalization water tank 130.

The equalization water tank 130 is to appropriately manage an emergency situation where a large amount of water is instantaneously evaporated or a large amount of water is drained due to leakage from the water tank 120, and the equalization water tank 130 serves to prevent the water tank 120 from being out of water in such emergency situations.

The equalization water tank 130 may be configured to be in fluid communication with the water tank 120. The equalization water tank 130 may be filled with water. In this case, the waste heat recovery system 100 may be configured such that water is supplied from the equalization water tank 130 to the water tank 120 in accordance with a pressure difference between a water pressure of the equalization water tank 130 and a liquid pressure of the water tank 120. For example, the water tank 120 and the equalization water tank 130 are connected in fluid communication through their respective bottoms via an equalization pipe EQL, and in an event where the aforementioned pressure difference occurs, water is supplied from the equalization water tank 130 to the water tank 120 via the equalization pipe EQL and subsequently, the flow control valve V4 operates in accordance with a water level drop signal measured by the water level meter LT installed in the equalization water tank 130, so that water is supplied to the equalization water tank 130 from the outside via a water supply pipe L5, allowing the water level in the equalization water tank 130 to remain constant. For example, the temperature of liquid filled in the water tank 120 may be more than 80° C., and the temperature of water filled in the equalization water tank 130 may be less than 50° C., but the present disclosure is not limited thereto.

Figure 7:
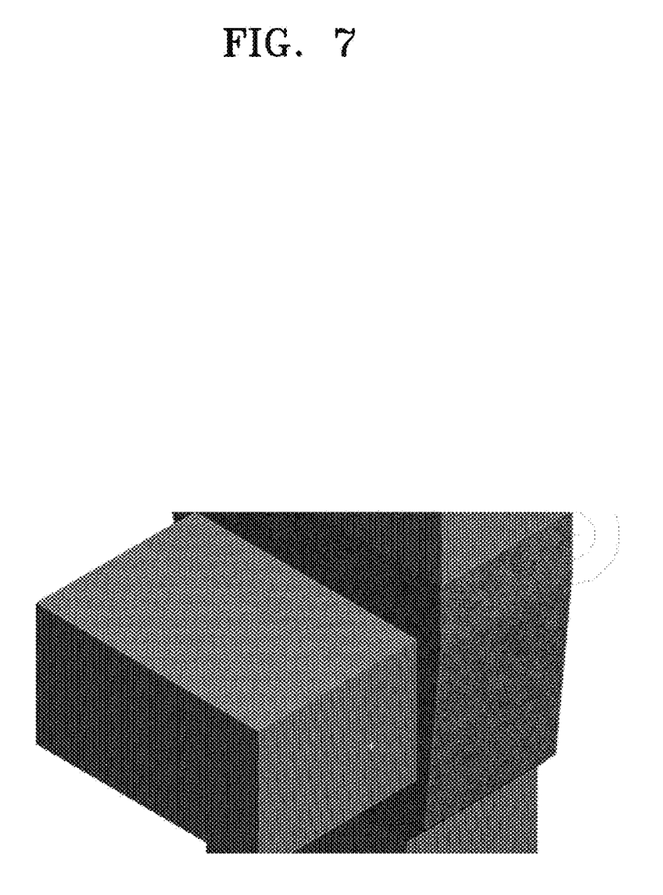
FIG. 7 is a diagram showing a simulation model of the waste heat recovery system of FIG. 1.
Figure 8:
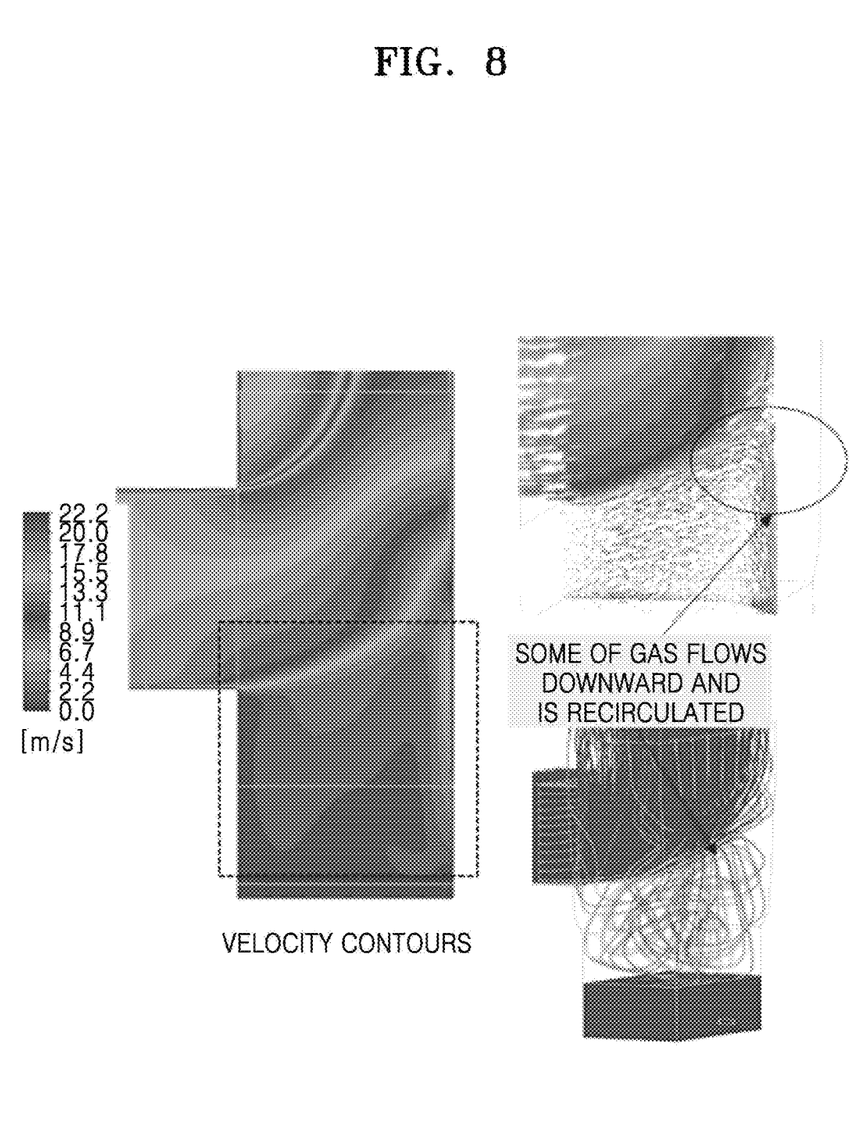
FIG. 8 is a diagram showing velocity contours as a result of simulation of the waste heat recovery system of FIG. 1.
Figure 9:
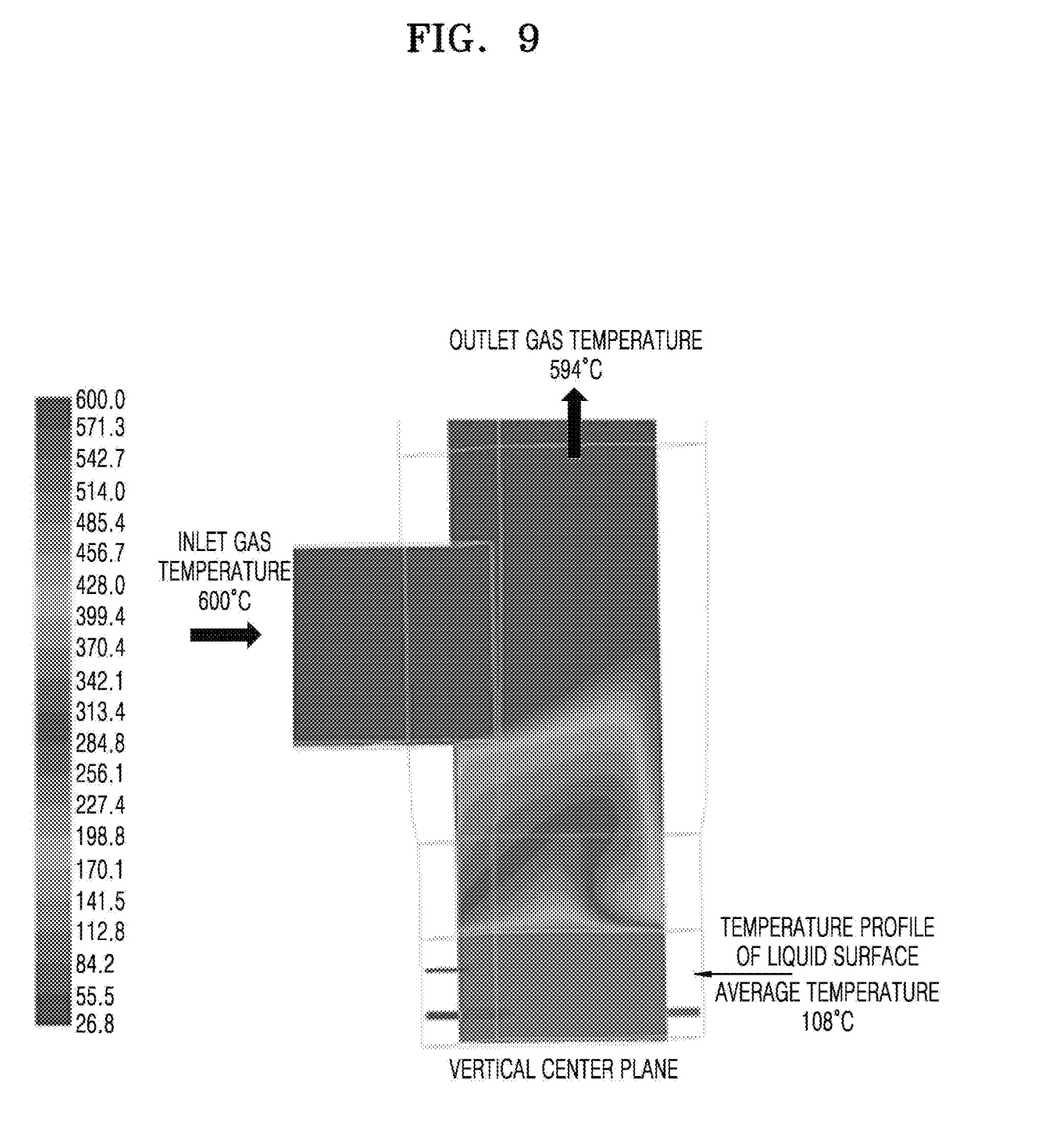
FIG. 9 is a diagram showing a temperature contour line as a result of simulation of the waste heat recovery system of FIG. 1.

FIG. 7 is a diagram showing a simulation model of the waste heat recovery system 100 of FIG. 1, FIG. 8 is a diagram showing velocity contours as a result of a simulation of the waste heat recovery system 100 of FIG. 1, and FIG. 9 is a diagram showing a temperature contour as a result of simulation of the waste heat recovery system 100 of FIG. 1.

Hereinbelow, the result of a simulation of a waste heat recovery method that removes accumulated dusts or fallen dusts on-line by using the water tank 120, while recovering waste heat from exhaust gas by using the waste heat recovery system 100 of FIG. 1, will be described with reference to FIGS. 7 to 9.

The simulation was performed using commercial CFD (Computational Fluid Dynamics) software (Fluent 2020 R1) and the geometry and boundary conditions applied thereto were as follows.

<Geometry>

As illustrated in FIG. 2, d11 was set to 3,883 mm, d12 was set to 3,200 mm, d13 was set to 2,882 mm, d21 was set to 1,752 mm, d22 was set to 3,441.5 mm, d23 was set to 850 mm, and d24 was set to 950 mm.

In addition, as illustrated in FIG. 3, d14 was set to 793 mm, and d15 was set to 1,885 mm.

In addition, the material of the waste heat supply member 110 was set to a composite composed of a 125 mm-thick refractory material and a 6 mm-thick CS steel (carbon steel), and the material of the water tank was set to a 6 mm-thick SS steel (stainless steel).

In addition, the density, heat conductivity, and specific heat capacity of the refractory material, CS steel, and SS steel were set as shown in Table 1.

TABLE 1

| Material | Density kg/m³ | Heat conductivity (W/m · K) | Specific heat capacity J/kg · K |
|---|---|---|---|
| Refractory material | 1,150 | 0.3 | 700 |
| CS steel | 7,801 | 43 | 473 |
| SS steel | 7,850 | 14 | 490 |

Also, the wind speed was set to 2.5 m/s, and the ambient temperature was set to 45° C.

<Boundary Conditions>

Exhaust gas being supplied to the waste heat supply member 110 was set to have a molecular weight of 26.61, a flowrate of 115,676 kg/hr, and a temperature of 600° C.

In addition, the exhaust gas being discharged from the waste heat supply member 110 was set to have a pressure of 70 mbar (gauge pressure).

In addition, a water supply pipe L1 connected to the water tank 120 was set to have an inner diameter of 1.5 inches, a flowrate of 2 ton/hr, and a temperature of 40° C.

In addition, a water drain pipe L2 connected to the water tank 120 was set to have an inner diameter of 3 inches and a flowrate of 12 ton/hr.

In addition, a circulation pipe L3 connected to the water tank 120 was set to have an inner diameter of 3 inches, a flowrate of 10 ton/hr, and a temperature of 60° C.

In addition, liquid filled in the water tank 120 was set to have a density of 1,150 kg/m³ and a water level of 1,650 mm.

<Set-Up Conditions>

As illustrated in FIG. 7, the exhaust gas flow path, which corresponds to the space inside the waste heat supply member 110, was divided by a plurality of meshes, and simulations were performed. The set-up conditions were summarized and are shown in Table 2.

TABLE 2

| Simulation set-up list | Input parameter |
| --- | --- |
| Simulation type | Transient |
| Turbulence model | Realizable K-epsilon |
| Wall function | Scalable wall functions |
| Two-phase model | Mixture |
| Pressure-velocity coupling | SIMPLE |
| Number of mesh elements | Around 3 million |
| CFD S/W | Fluent 2020 R1 |
| Number of iterations | Around 30,000 |

<Simulation Results>

Referring to FIG. 8, the image on the left is a diagram showing velocity contours of exhaust gas flowing through the exhaust gas flow path corresponding to the space inside the waste heat supply member 110, and the image on the right is an expanded view of the dotted square portion of the left image. As shown in the image on the right of FIG. 8, it could be confirmed that part of the exhaust gas flows downward to enter the water tank 120. In this case, dusts included in the exhaust gas fall to the water tank 120 due to gravity.

Referring to FIG. 9, it could be confirmed that in a case in which 600° C. exhaust gas is supplied to the waste heat supply member 110, the temperature of exhaust gas being discharged upward by passing through the waste heat supply member 110 is 594° C., and the temperature of the surface of liquid filled in the water tank 120 is 108° C. As such, because the temperature of the surface of liquid filled in the water tank 120 is merely 108° C., there is no excessive amount of water evaporated from the water tank 120, and the thermal damage to the water tank 120 and the surrounding equipment is negligible. From this result, it could be confirmed that even in a case in which exhaust gas of a temperature as high as 500° C. or more is supplied to the waste heat recovery boiler to recover waste heat, dusts can be removed on-line while continuously recovering waste heat without shutting down the waste heat recovery system 100 to remove dusts that may cause an increase in differential pressure.

The present disclosure has been described with reference to the drawings, but these are merely illustrative examples, and it will be apparent to those skilled in the art that various modifications and equivalent implementations can be made therein. Therefore, the scope of the present disclosure should be defined by the appended claims.

The invention claimed is:

1. A waste heat recovery system comprising: a waste heat recovery boiler;
   a waste heat supply member configured to supply waste heat to the waste heat recovery boiler;
   a water tank configured to be in fluid communication with the waste heat supply member;
   an equalization water tank configured to be in fluid communication with the water tank;
   a water supply pipe, a water drain pipe, and a circulation pipe branched from the water drain pipe, each configured to be in fluid communication with the water tank;
   a first flow control valve installed in the water supply pipe, and a second flow control valve installed in the circulation pipe; and
   a water level meter configured to measure a level of liquid filled in the water tank, a pump configured to discharge liquid from the water tank, and a third flow control valve installed at a back-end of the circulation pipe as a back-end of the pump and configured to control a discharge amount of liquid in accordance with a signal of the water level meter,
   wherein the water tank is configured to mix the dusts introduced therein with water to thereby form aqueous solution,
   wherein the waste heat recovery system is configured to maintain a concentration of sodium carbonate in liquid filled in the water tank at a reference value or less,
   wherein the waste heat recovery system is configured to supply water to the water tank from the equalization water tank in accordance with a pressure difference between water pressure of the equalization water tank and liquid pressure of the water tank.

2. The waste heat recovery system of claim 1, wherein the waste heat recovery boiler comprises an exhaust gas flow path and a plurality of cooling tubes disposed to be spaced apart from each other within the exhaust gas flow path.

3. The waste heat recovery system of claim 1, wherein the waste heat supply member comprises a main duct, an inflow duct, and an outflow duct, wherein the inflow duct is configured to be in fluid communication with a side portion of the main duct, the outflow duct is configured to be in fluid communication with an upper portion of the main duct, and the water tank is configured to be in fluid communication with a lower portion of the main duct.

4. The waste heat recovery system of claim 1, further comprising an air blaster configured to, in a case in which dusts originating from exhaust gas accumulate in the waste heat supply member, forcibly transfer the accumulated dusts to the water tank.

5. The waste heat recovery system of claim 1, further comprising a flexible joint disposed between the main duct and the water tank and configured to connect the main duct and the water tank to each other.

6. The waste heat recovery system of claim 5, not comprising a dust falling hindering member between the main duct and the water tank.

7. A waste heat recovery method comprising:
   a step (S10) of supplying exhaust gas of a high temperature of 500° C. or more to a duct-shaped waste heat supply member;
   a step (S20) of recovering waste heat by supplying, to a waste heat recovery boiler, a portion of the exhaust gas having passed through the waste heat supply member;
   a step (S30) of supplying, to a water tank, a remaining portion of the exhaust gas having passed through the waste heat supply member;
   a step (S40) of maintaining a concentration of sodium carbonate in a liquid filled in the water tank at a reference value or less;
   a step (S50) of measuring a level of the liquid filled in the water tank; and
   a step (S60) of supplying water to the water tank from an equalization water tank in fluid communication with the water tank, in accordance with a pressure difference between a water pressure of the equalization water tank and a liquid pressure of the water tank, in an emergency situation where a large amount of water is instantaneously evaporated, or a large amount of water is drained due to leakage from the water tank,
   wherein the water tank is configured to mix the dusts introduced therein with water to thereby form aqueous solution,
   wherein the step (S40) comprises a step (S40-1) of supplying water to the water tank at a first flowrate, a step (S40-2) of discharging a liquid filled in the water tank at a second flowrate, a step (S40-3) of recirculating a portion of the liquid discharged in the step (S40-2) to the water tank at a third flowrate, and a step (S40-4) of discharging a remaining portion of the liquid discharged in the step (S40-2) out of the water tank at a fourth flowrate, and wherein the fourth flowrate in the step (S40-4) is determined according to the level of the liquid in the water tank measured in the step (S50).

8. The waste heat recovery method of claim 7, wherein the step (S30) is configured to allow a portion of dusts included in the exhaust gas to fall to the water tank by gravity without being hindered by a dust falling hindering member.

* * * * *